PIPELINE PLUGGING APPARATUS AND METHODS

Filed Oct. 18, 1967 7 Sheets-Sheet 1

David D. Nagel
INVENTOR

BY Arnold, Roylance, Kruger & Durkee
ATTORNEYS

David D. Nagel
INVENTOR

BY Arnold, Roylance, Kruger & Durkee
ATTORNEYS

PIPELINE PLUGGING APPARATUS AND METHODS

Filed Oct. 18, 1967 7 Sheets-Sheet 3

David D. Nagel
INVENTOR

BY Arnold, Roylance, Kruger & Durkee
ATTORNEYS

PIPELINE PLUGGING APPARATUS AND METHODS

Filed Oct. 18, 1967 7 Sheets-Sheet 4

David D. Nagel
INVENTOR

BY Arnold, Roylance, Kruger & Durkee
ATTORNEYS

PIPELINE PLUGGING APPARATUS AND METHODS

Filed Oct. 18, 1967 7 Sheets-Sheet 5

David D. Nagel
INVENTOR

BY Arnold, Roylance, Kruger & Durkee
ATTORNEYS

PIPELINE PLUGGING APPARATUS AND METHODS

Filed Oct. 18, 1967 7 Sheets-Sheet 6

David D. Nagel
INVENTOR

BY Arnold, Roylance, Kruger & Durkee
ATTORNEYS

David D. Nagel
INVENTOR

BY Arnold, Roylance, Kruger & Durkee
ATTORNEYS

United States Patent Office 3,495,626

Patented Feb. 17, 1970

3,495,626

PIPELINE PLUGGING APPARATUS AND METHODS

Dave D. Nagel, Houston, Tex., assignor to American Machine & Foundry Company, New York, N.Y., a corporation of New Jersey Filed Oct. 18, 1967, Ser. No. 676,215

Int. Cl. F16l *55/12;* G01r *19/00*

U.S. Cl. 138—97 3 Claims

ABSTRACT OF THE DISCLOSURE

This application discloses apparatus for temporarily plugging pipeline at a repair location, the apparatus being movable through the pipeline under propulsion of the fluid product in the line. The plugging apparatus is operated by transmitting signals through the pipeline walls to provide stopping, sealing and bypass venting functions. Methods of plugging a pipeline are disclosed using two or three of the plugging devices with sealing, venting and recovery of the devices provided in response to signals transmitted through the walls, provision being made for removing the product from the line at the repair location.

Pipelines used in transporting liquid petroleum products or natural gas extend for many hundreds or even thousands of miles, often through heavily populated areas. Any leaks or potential failures caused by corrosion or damage must be immediately repaired; failure of the line being quite dangerous due to the high pressures involved and the inflammable nature of the product. Even in remote areas, the financial loss caused by a failure may be high due to escape of large quantities of the valuable fluid products being transported and interruption of the pipeline service.

Usually the repair of a pipeline includes replacing a section of pipe by cutting out the defective section and welding in a new one. During this operation, pressure must be relieved at the section under repair and the product removed from the line. However, the pipelines usually extend for perhaps fifty miles between pumping stations, with no valves or other fittings in the fifty mile interval. While valves may be closed at the pumping stations to stop further flow through the section to be replaced, enormous quantities of the product still remain in the many miles of pipeline between pumping stations. Very high fluid pressures may exist at the location of the repair due to the contour of the surrounding land; if the section to be replaced is in a valley between elevations of hundreds or thousands of feet then the static head at the repair location may be almost as great as when the pumps are in operation. Merely tapping the line at the repair location and dumping the product is unacceptable due to the value of the product in the lines, the potential danger at the repair location due to the inflammable nature of the product, the fact that large quantities of a liquid product would hamper repair operations, and due to the damage to vegetation and the unsightly nature of the product if dumped near a populated area. Construction of temporary storage tanks or ponds near the repair location to store the fluid in the pipeline is unduly expensive and time consuming, especially in remote locations.

To provide temporary blocking of a pipeline at a repair location it has thus been found preferable to use plugging devices to seal the pipeline, a variety of devices for accomplishing this purpose being available. Usually the device is in the form of a "pig" assembly which is inserted into the pipeline at a trap of the type located at pumping stations to insert scrapers. These devices are adapted to travel along the pipeline under propulsion of the fluid product until the repair location is reached. At this point it has heretofore been necessary to provide rather large openings in the pipeline so that a mechanical device may be inserted to stop the pig and operate the sealing mechanism. Ordinarily the seal is effected by expanding a rubber packer against the inside walls of the pipeline, the expandable mechanical member unfortunately requiring insertion of a rather large shaft or other mechanical linkage through the pipeline wall. Usually two of the devices are required, one upstream and one downstream from the section to be repaired, and so to move these individually to the desired location and then propel the devices to the next pumping station for recovery after the repair has been completed requires bypassing of the fluid product around the sealed device. This has been done external to the pipeline by installing fittings, valves, and temporary lines, a time consuming and expensive part of the repair operation.

It is therefore the object of the present invention to provide improved techniques and apparatus for temporarily plugging pipeline at remote locations for repair purposes, particularly for plugging the pipeline upstream and downstream from a section of the pipeline to be repaired or altered without the necessity for inserting large mechanical devices through the walls of the pipeline or otherwise making a large number of, or large diameter, taps through the pipeline wall. Another object is to provide improved methods and apparatus which permit quick and inexpensive repair of remote sections of pipeline by minimizing shutdown time and eliminating the cost of much of the valve installation and bypass line construction as well as reducing the size of excavation at the repair location and similar costly and time consuming procedures incidental to pipeline repair.

In accordance with the invention, an important feature is the provision of pipeline plugging apparatus which may be propelled through the pipeline from a trap up to the point of repair and then remotely actuated by signals transmitted through the pipeline wall rather than by mechanical devices inserted through the wall. The signaling technique used may include various magnetic devices, eddy current generators, gamma ray sources, or others. The plugging device includes a detector responsive to the transmitted signals and adapted to operate plugging means which ordinarily would be an expandable rubber packer. Preferably a bypass port through the plugging apparatus is included, and this port may also be opened or closed by signaling through the pipeline wall to provide functions such as propulsion of another plugging pig, removal of the product from the section to be repaired, and recovery of the devices after repair of the line.

The novel features believed characteristic of this invention are set forth in the appended claims. The invention itself, however, as well as further objects and advantages thereof, will best be understood by reference to the following detailed description of particular embodiments, when read in conjunction with the accompanying drawings, wherein:

Figures 1, 2, 3, 4:
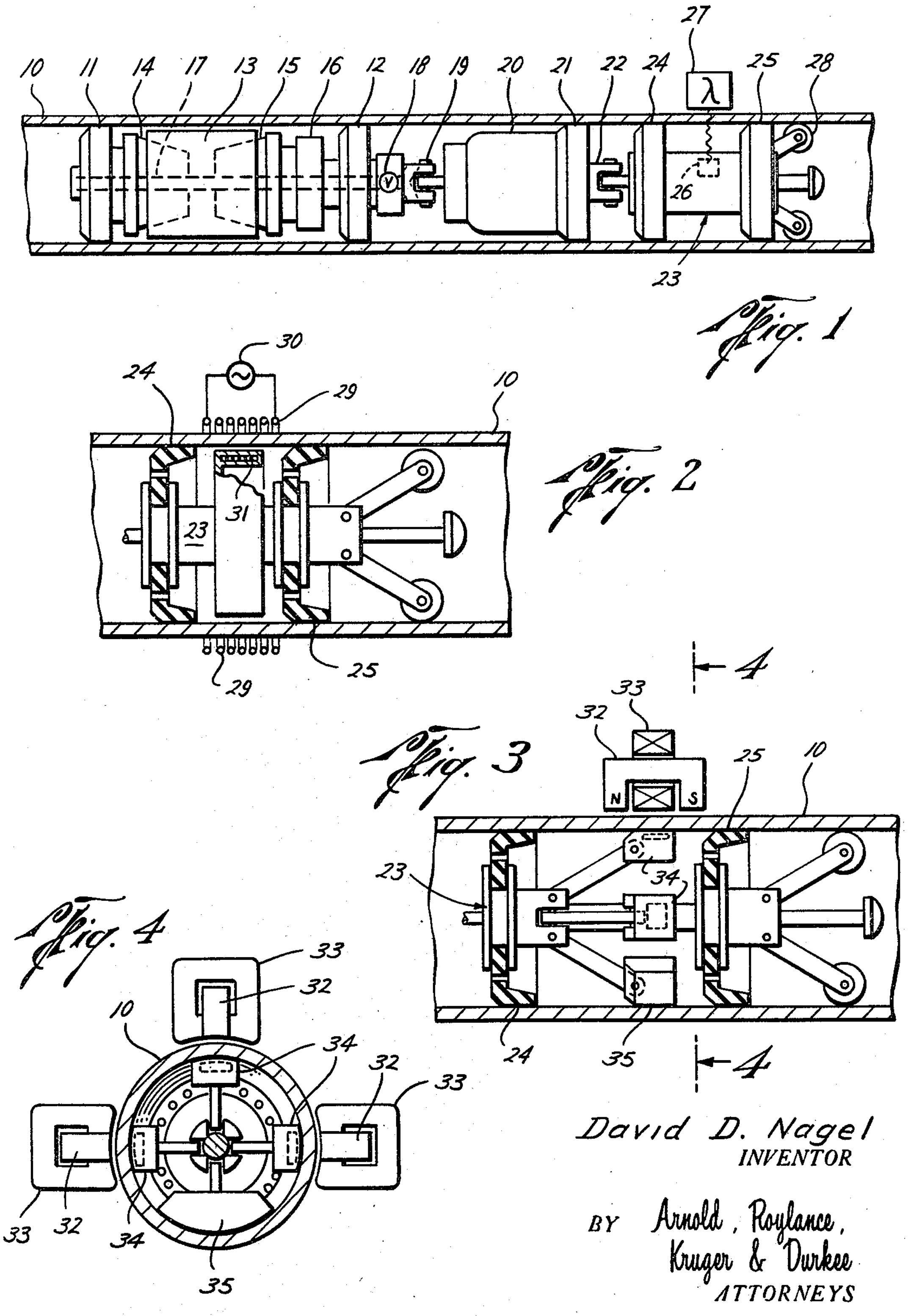
FIGURE 1 is an elevational view in section of a segment of a pipeline containing plugging apparatus according to the invention, illustrated in schematic form.
FIGURE 2 is an elevational view, partly in section, of a portion of the apparatus of FIGURE 1 according to another embodiment.
FIGURE 3 is an elevational view, partly in section, of the detector and instrumentation segment of the apparatus of FIGURE 1 according to still another embodiment.
FIGURE 4 is an end view in section of the apparatus of FIGURE 3, taken along the line 4—4 in FIGURE 3.
Figure 7:
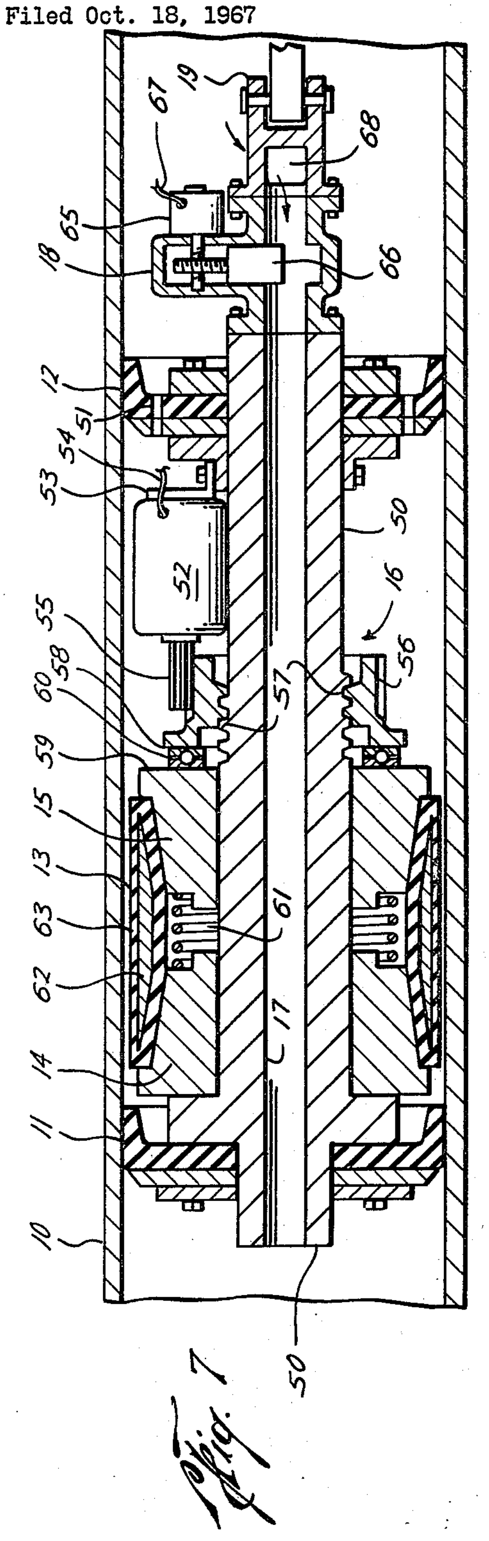
Figure 8:
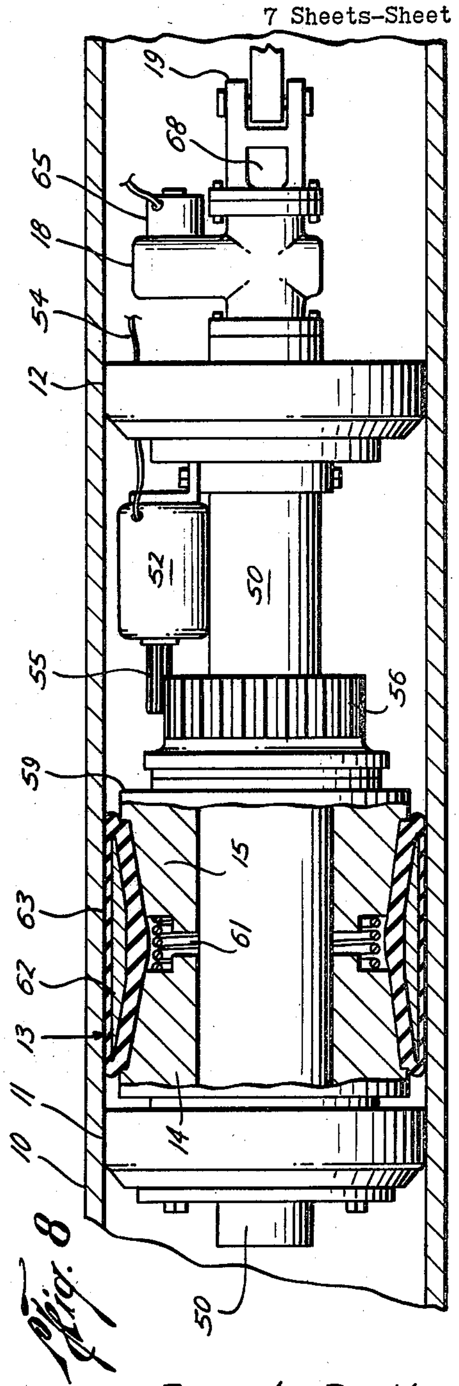
Figure 9:
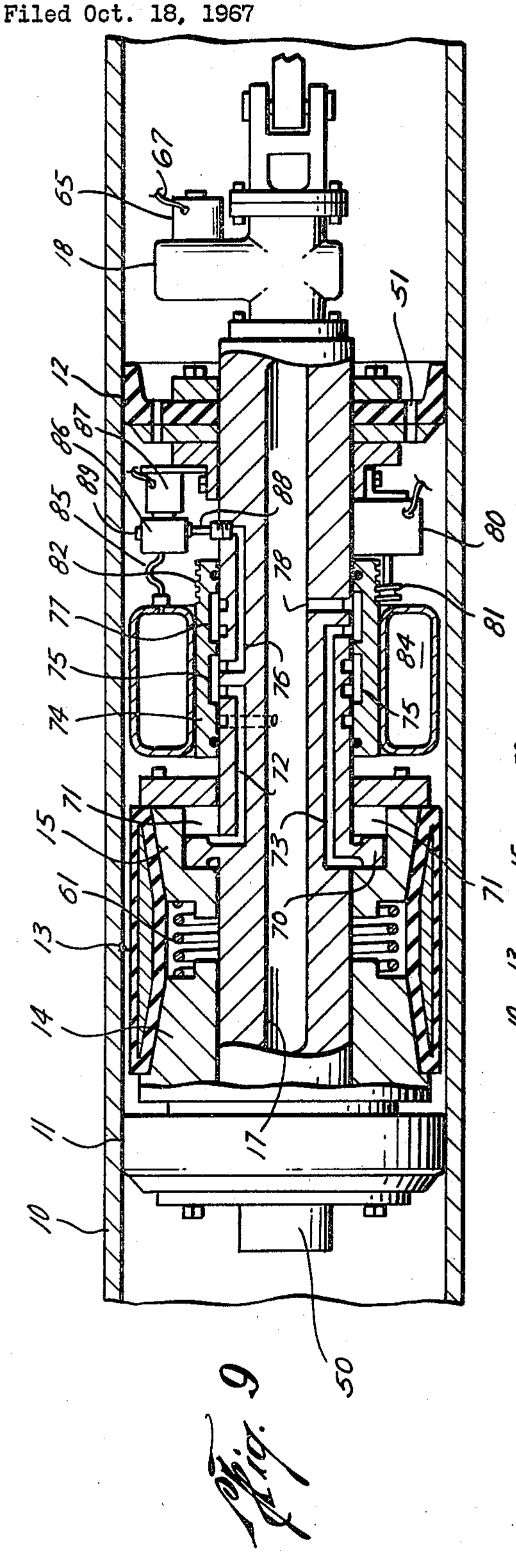
Figure 10:
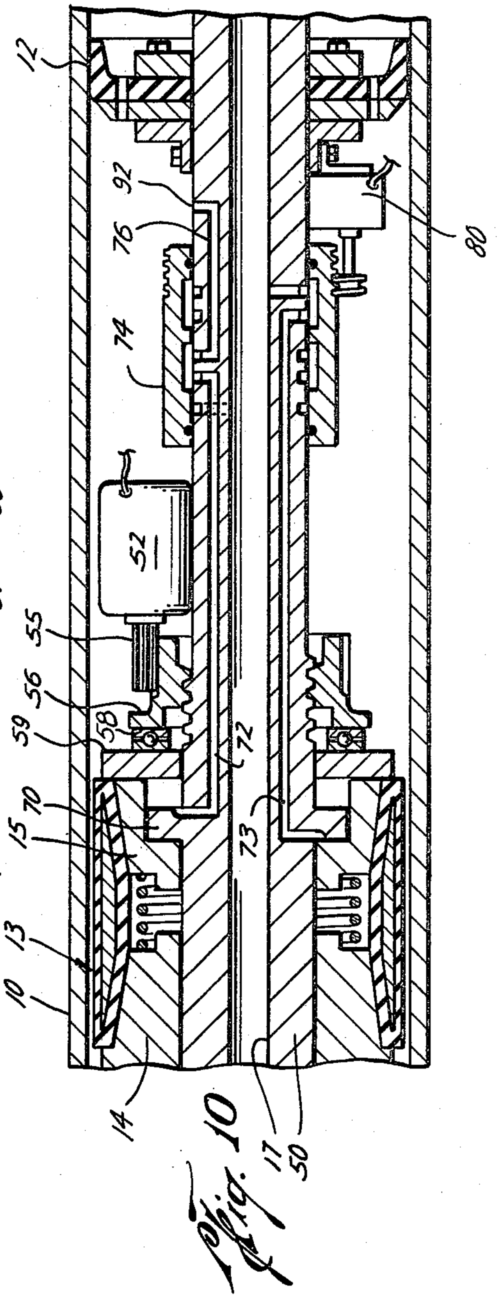
Figure 11:
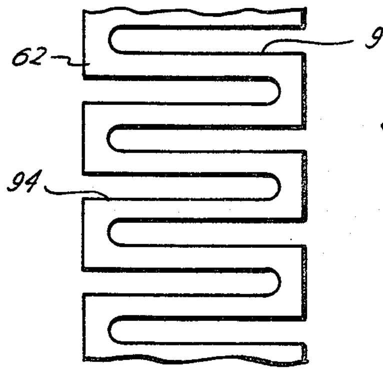
Figure 12:
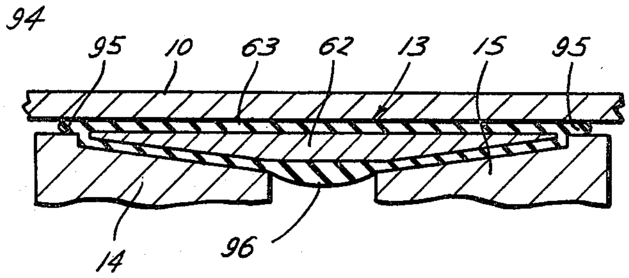
Figure 13A:
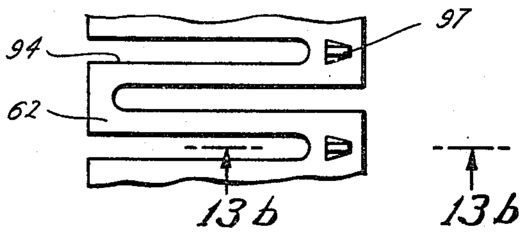
Figure 13B:
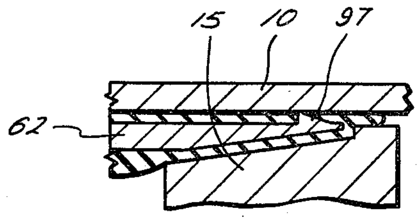
Figure 17:
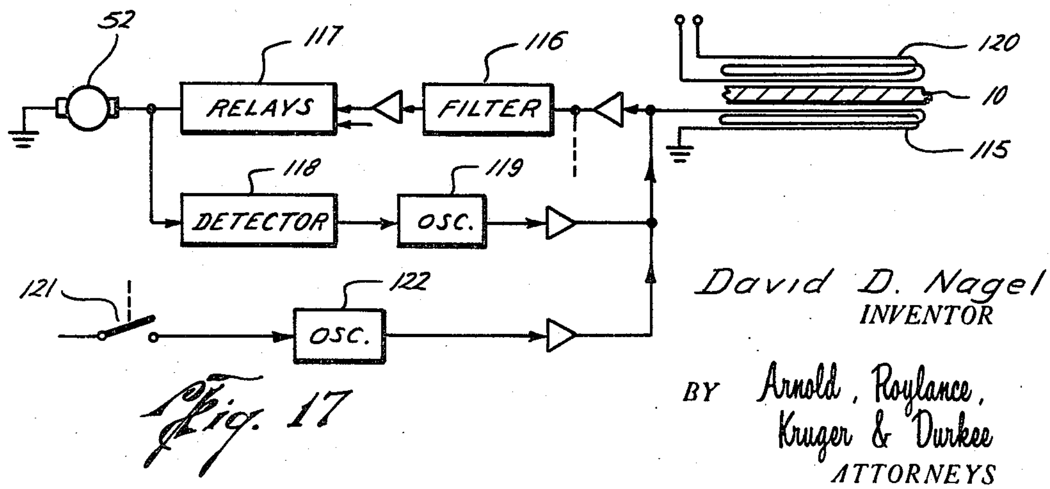
Figure 14:
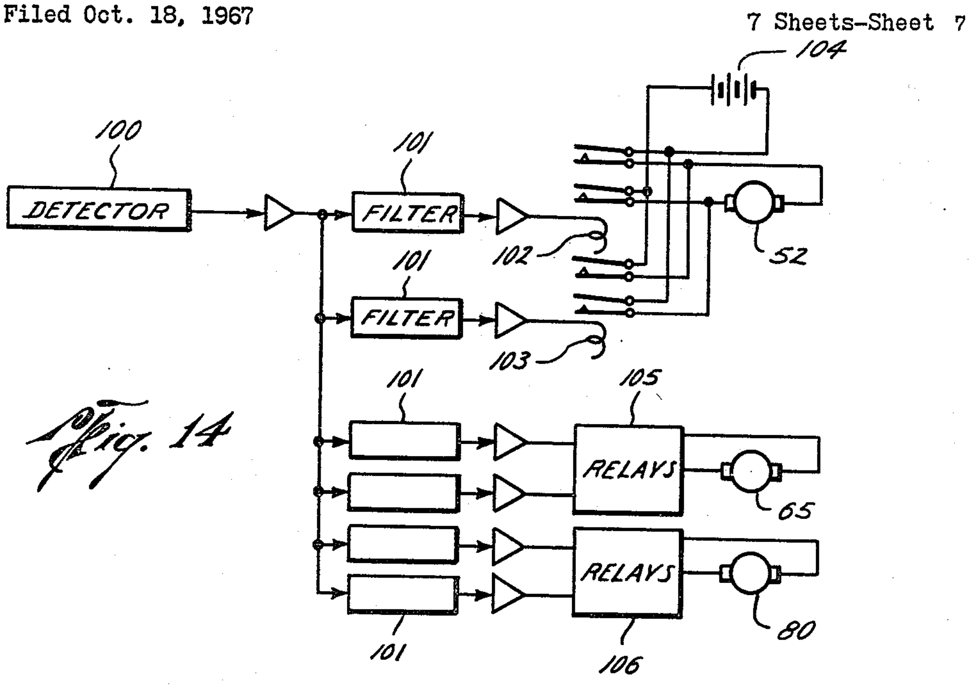
Figure 15:
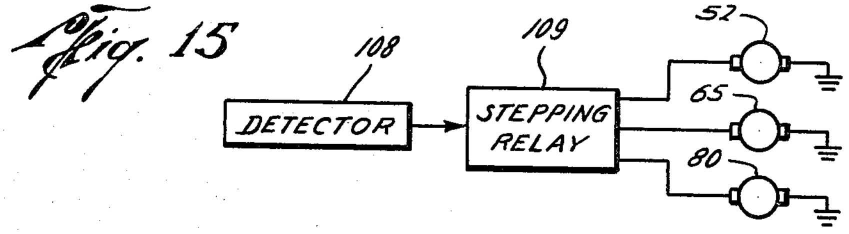
Figure 16:
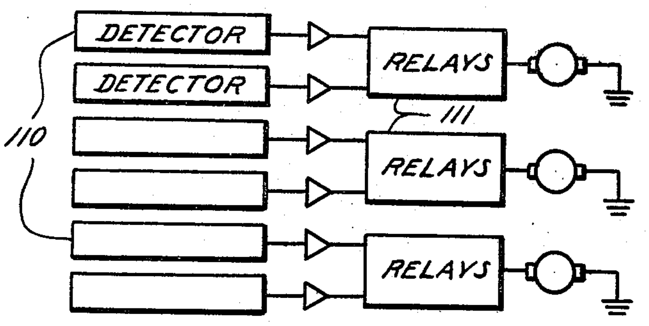

FIGURES *5a* through *5f* are schematic illustrations of a portion of a pipeline depicting a method of plugging a pipeline according to the invention, the apparatus of FIGURES 1–4 being utilized;

FIGURES 6*a*–6*h* are schematic illustrations of a segment of pipeline depicting another method of plugging a pipeline according to the invention;

FIGURE 7 is an elevational view, partly in section, of the sealing or plugging portion of the apparatus of FIGURE 1, according to one embodiment;

FIGURE 8 is an elevational view, partly in section, of the portion of the apparatus of FIGURE 7, in a plugged condition;

FIGURE 9 is an elevation view, partly in section, of another embodiment of the plugging apparatus, similar to the view of FIGURE 7;

FIGURE 10 is an elevation view of a different embodiment of the plugging apparatus according to the invention;

FIGURE 11 is an expanded plan view of a portion of the plugging member used in the apparatus of FIGURES 7–10;

FIGURE 12 is a detail view in section of the expanding gasket or plugging member used in the apparatus of FIGURES 7–10;

FIGURE 13*a* is a detail view in section of a part of the view of FIGURE 12 according to another embodiment;

FIGURE 13*b* is a plan view of a portion of the structure of FIGURE 13*a*;

FIGURE 14 is an electrical schematic diagram, partially in block form, of circuitry utilized in the apparatus of the invention;

FIGURE 15 is an electrical diagram of circuitry used in another embodiment;

FIGURE 16 is an electrical diagram of circuitry for providing the same function as that of FIGURES 14 and 15 according to another embodiment; and FIGURE 17 is an electrical diagram of circuitry similar to that of FIGURE 14 but including a feedback function according to an embodiment of the invention.

With reference now to FIGURE 1 of the drawings, apparatus adapted to be propelled along a pipeline 10 is illustrated in schematic form. The pipeline 10 is of the type commonly used for transporting natural gas or liquid petroleum products over long distances. The apparatus shown in the pipeline is therefore adapted to be inserted into the pipeline at a trap of the type usually present at a pumping station, propelled along the pipeline by movement of the product under pressure up to the position where the pipeline needs to be repaired, then stopped to perform the functions to be described. The plugging apparatus of FIGURE 1 includes a train of assemblies connected to one another by pivots or universal joints so that the apparatus will move freely through the pipeline around bends, etc. The first segment of the assembly comprises a generally cylindrical arrangement including a pair of disk-shaped rubbers or packers 11 and 12 of conventional form, the pack 11 functioning as the drive mechanism as it captures fluid urged against it from the right causing the entire assembly to move from right to left in the pipeline 10, so long as there is a substantial pressure differential across the packer 11. The main operating portion of the plugging assembly is included in the first segment and comprises a cylindrical expandable rubber member 13, reinforced with a steel spring band as will be described, which fits over a pair of opposing cone-shaped members 14 and 15. Under power supplied by line pressure, hydraulic means, or electrical means, the cones 14 and 15 may be driven toward one another in an axial direction to force the rubber member 13 radially outward toward the walls of the pipeline, thereby to effect a plug or seal for the pipeline. It will be noted that the plugging assembly may be required to hold against pressures of up to perhaps 500 or 1000 p.s.i., and so a positive, rugged sealing arrangement of this type is needed, an arrangement utilizing merely packers such as the packers 11 and 12 being inadequate. A control mechanism 16, actuated by line pressure or other means, is effective under control of electrical signals to cause the cones 14 and 15 to be forced toward one another to effect the seal, to hold the assembly in a sealed condition, or to release the seal by driving the cones 14 and 15 away from one another. Apparatus for providing the functions of the control mechanism will be explained in more detail below in reference to FIGURES 7–10.

Several of the operating steps referred to herein require the plugging assembly to be stopped with the plugging member 13 forced against the pipewall, but require bypassing of the fluid product in the line to permit movement of one of the other plugging assemblies or discharge of effluent. To this end, an axial bore 17 is provided in the assembly to act as a bypass port, passage of fluid through the port 17 being controlled by a valve 18 which is electrically operated by signals coupled from outside the walls of the pipeline.

The rear end of the front segment of the assembly is connected by a universal joint 19 to a battery and instrument package 20. This segment uses a packer 21 which contains through ports so that fluid may pass through, only the packer 11 functioning to drive the assembly. The package 20 contains batteries for supplying power to all of the electrical circuitry of the plugging assembly so that the assembly may be self-contained in traveling through the pipeline, no external lines or trailing lines being necessary. The package 20 may also contain electronic circuitry for controlling and operating the valves, motors and other equipment in the plugging assembly. Electrical cables, not shown, connect the package 20 with other segments of the plugging apparatus, these being merely conventional cables bridging the universal joints, suitable plug-in connectors being used.

The trailing end of the battery package is connected by another universal joint 22 to a detector and instrument package 23. This segment includes a pair of packers 24 and 25 which are vented or ported just as the packer 21, thus functioning merely to hold the package in place and cushion it against collision with obstructions in the pipeline rather than to propel the package. The package 23 includes a detector device 26 which in this embodiment may be a crystal or photomultiplier responsive to gamma radiation. The signals used to cause operation of the various equipment in the plugging assembly are transmitted through the walls of the pipeline 10 by a suitable gamma radiation source 27 which is positioned in a portable housing along with shielding to minimize radiation hazards. Several different signals must be transmitted to the plugging assembly to cause it to perform the various functions of stopping, sealing, bypass venting, releasing, etc. Accordingly the radiation source 27 may contain gamma ray sources of several distinct energy levels, each being provided with a lead shutter so that the signals may be selectively transmitted after the housing for the source 27 is in place. The detector 26 may then comprise several crystals each of which is responsive only to a particular band of energy levels corresponding to one of the energy levels produced by the source 27. Alternatively, a single gamma ray source may be employed with a shutter which may be rotated at several distinct speeds, producing pulses of radiation at certain frequencies. The detector 26 then would include filters to distinguish between signals of different frequency. The detector and instrument package 23 may include a centering mechanism including a pair of wheels 28 which are spring biased to ensure that the package is centered along the axis of the pipeline rather than settling by gravity toward the lower part of the pipeline. A bumper may be used to prevent damage to the instrument package should another of the plugging assemblies accidentally collide with the apparatus.

In place of the gamma ray source and detector used in the assembly of FIGURE 1 for coupling control signals from outside the walls of the pipeline, other techniques may be used as will be described with reference to FIGURES 2–4. An eddy current coil 29 may be wrapped around the outside diameter of the pipeline 10 as seen in FIGURE 2, a quick disconnect coupling of course being used, whereby application of AC power from a source 30 to the coil 29 will produce eddy currents in the metal pipewall. The eddy currents produced thereby may be detected inside the pipewall by a flux detector coil 31 mounted around a central part of the instrument package 23. It is noted that the instrument package is otherwise similar to the embodiment shown in FIGURE 1, including the packers 24 and 25 and the centering mechanism. The mechanism of FIGURE 2 would of course be used along with the remainder of the apparatus of FIGURE 1. The several control functions may be implemented in the eddy current signalling system of FIGURE 2 by varying the output frequency of the source 30 and utilizing a series of band pass filters in the circuitry following the flux detector coil 31. Thus, each selected frequency produced by the source 30 would result in an output from one of the filters connected to the coil 31, such output being used to close electrical contacts and thus to actuate the control mechanism 16 for the plugging mechanism 13, or to open or close the valve 18, as will be explained with reference to FIGS. 14–16.

In FIGURE 3, an embodiment of the detector and instrument package 23 is shown which utilized flux leakage detectors rather than the gamma ray or eddy current signaling systems of FIGURE 1 or 2. In this embodiment, signals are coupled through the pipewall by large magnets 32, these being either permanent magnets or preferably electromagnets excited by coils 33. By using electromagnets the cores 32 may be selectively energized in the desired sequence to provide the necessary operation of the various functions of the plugging assembly. Flux produced by the magnets 32 will pass principally through the ferromagnetic pipeline wall, but leakage flux will also exist near the inside surface of the pipewall and this leakage may be detected by Hall effect devices or magnetometers located in detector shoes 34. Three such detector shoes 34 are illustrated, although any desired number may be utilized. The detector shoes are arcuately spaced from one another by 90°, energization of one of the magnets 33 producing a detectable signal at only one of the detector shoes 34, thus providing selective signaling. The detector shoes 34 are maintained in the proper angular positions by a large weight 35 which is pivotally connected to the package 23 so as to drag along the lower portion of the pipeline and hold the shoes 34 in place. The shoes 34 are yieldably and pivotally urged against the inside wall of the pipeline by arm and spring arrangements of conventional design.

It will be appreciated that the techniques illustrated in FIGS. 1–4 for signaling through the pipeline wall are merely illustrative, it being apparent that other arrangements may be employed, such as ultrasonics. The important feature here is that it is not necessary to insert mechanical linkages through the pipeline wall as heretofore required to operate plugging devices. Two or more of the signaling techniques of FIGURES 1–4 may be utilized in combination rather than utilizing varying frequencies or angular positions as illustrated. For example, the gamma ray source and detector as in FIGURE 1 may be used to operate the control device 16 for the plugging arrangement 13–15, while an eddy current source and detector as in FIGURE 2 used to operate the valve 18 for bypassing or sealing the fluid product. Although requiring more than one pair of sources and sensors, the use of two different signaling techniques may result in a more simple instrumentation arrangement in the plugging assembly since various frequencies or energy levels need not be processed together.

Utilizing the plugging assembly of FIGURES 1, along with one or more of the signaling techniques of FIGURES 1–4, several operative functions may be provided upon command. The first function will of course be that of traveling along the pipeline wherein the plugging member 13 will be in the contracted or release position and the valve 18 will ordinarily be closed In this condition the plugging apparatus will be propelled along the pipeline at a speed determined by the volume of the fluid product being pumped through the pipeline. It may be desirable to open, or partly open, the valve 18 while the plugging apparatus is in the moving condition to thereby slow down the rate of movement, or control the speed of movement. Thus, the plugging assembly may be permitted to move quite rapidly from the pumping station up to the general vicinity of the section to be repaired, then upon approaching the desired area the valve 18 caused to open by appropriate signaling so that the plugging apparatus will slow down markedly, permitting it to be stopped and sealed in precisely the position desired. In any event, the second major operating condition is that of expansion of the member 13 as caused by movement of the cone-shaped members 14 and 15 under control of the mechanism 16. In this condition, the outer surface of the member 13 will frictionally engage and be forced against the inside walls of the pipeline around its circumference and thus cause the plugging assembly to stop and be held firmly in place. While in this stopped and expanded condition, the valve 18 may be either open or closed, thus either bypassing or stopping flow of the fluid product, all of these functions being under control of the signaling arrangement. The remaining one of the primary operating functions of interest is that of releasing or contracting the plugging member 13 by spreading apart the cone-shaped members 14 and 15, this of course being also controlled by the signaling system. Prior to describing the details of construction of the plugging apparatus, some of the unique operating methods provided by apparatus of this type will be explained.

With reference now to FIGURES *5a–5f*, an operational method used in repairing pipeline is illustrated wherein an externally controlled plugging assembly such as that of FIGURES 1–4 is employed. A segment of a length of the pipeline 10 is shown wherein a section 36 between the dashed lines will be required to be removed and replaced due to the presence of leaks or flaws. This damaged or defective section 36 would ordinarily be detected by conventional leak detectors or by pigging apparatus containing flaw detectors and recorders as in the usual practice. Once the defective section has been identified and located, the pipeline will be exposed by an appropriate excavation 37, it being noted that the simplicity of the operating method permitted by this invention considerably reduces the necessary size of the excavation. A small fitting and valve 38 may be connected to the pipeline slightly upstream of the section 36 by the conventional "hot-tapping" method, this fitting 38 being much smaller than what needed by most of the conventional plugging techniques since this fitting is merely for the purpose of admitting an inert gas to flush out the effluent in the section to be repaired. A signal source 39 is positioned downstream of the section 36 near where it is desired to stop the plugging assembly. The signal source 39 may be one or more of the gamma ray sources, eddy current sources, or magnetic flux generators illustrated as signal sources in the apparatus in FIGURES 1–4. Now a first plugging assembly, designated as unit A, is inserted into the pipeline at the next adjacent upstream pumping station, this being up to perhaps fifty miles away from the section 36 to be repaired. This unit will initially be in the traveling condition, the plugging member 13 contracted and the valve 18 closed, so that the unit A will move along the pipeline at perhaps five to ten miles per hour until the signal source 39 is reached.

When the plugging unit A reaches the position just below the signal source 39, the detector in the instrumentation package for the assembly will receive a signal transmitted through the pipeline wall and cause the plugging member 13 to be rapidly expanded against the inside wall of the pipeline by forcing together the cones 14 and 15. Thus the plugging unit A will be in a stopped and plugged condition as indicated in FIGURE 5*b*. Also, the valve 18 will be opened so that the fluid product may still pass through the port 17 to a limited extent. Next, a second plugging assembly, including all of the apparatus of FIGURE 1, is inserted into the trap at the upstream pumping station and this assembly, designated as plugging unit B, travels down the line to the section to be repaired. A second signal source 40 has been positioned adjacent the upstream end of the section 36 so that when the plugging unit B reaches the desired position, its detector and control circuitry will be actuated so as to cause the plugging member 13 in the unit B to be expanded to stop and plug the unit. The valve 18 in the unit B would remain closed so that flow of the fluid product would stop, the plugging unit B now being in the condition indicated in FIGURE 5*c*.

To remove the effluent from the section 36 to be repaired, the valve 38 is now connected to a source of inert gas, such as nitrogen, the valve opened, and the gas permitted to enter the section 36 to flush out the effluent which will pass through the port 17 of the unit A and downstream into the pipeline. This step is necessary, particularly when the pipeline contains liquid petroleum products, to prevent spillage of the effluent in the work area where the section of pipeline is to be replaced, cutting and welding torches usually being employed for this purpose.

After the effluent has been flushed out, the signal source 39 transmits a signal to the unit A causing the valve 18 to close, thus sealing this unit. The section 36 might now be removed, as seen in FIGURE 5*d*, then replaced, the pipeline being securely plugged in both directions by the units A and B. After the section has been replaced, the inert gas may be vented out of the pipeline by the valve 38 if desired by merely opening the valve 18 by appropriate signals from one of the sources 39 or 40, permitting the inert gas to be replaced by the fluid product, this step being optional. As seen in FIGURE 5*a*, the next step includes releasing the plugging member 13 in the unit A by an appropriate signal from the source 39, along with closure of the valve 18 in the unit A if open, so that the unit A is free to travel downstream. The unit B is vented by opening its valve 18, the unit remaining plugged, via signals from the source 40 so that the fluid product may pass through and drive the unit A toward the next pumping station for recovery. After a suitable lead time to permit recovery of the unit A, the source 40 transmits signals to unit B to cause it to unplug or release by contraction of the plugging member 13, and the valve 18 in the unit B is closed so that the unit B is free to travel down the pipeline for recovery as seen in FIGURE 5*f*. The valve 38 may be removed and its hole sealed. The repair operation is now complete and the pipeline is back in full service.

Figure 5:
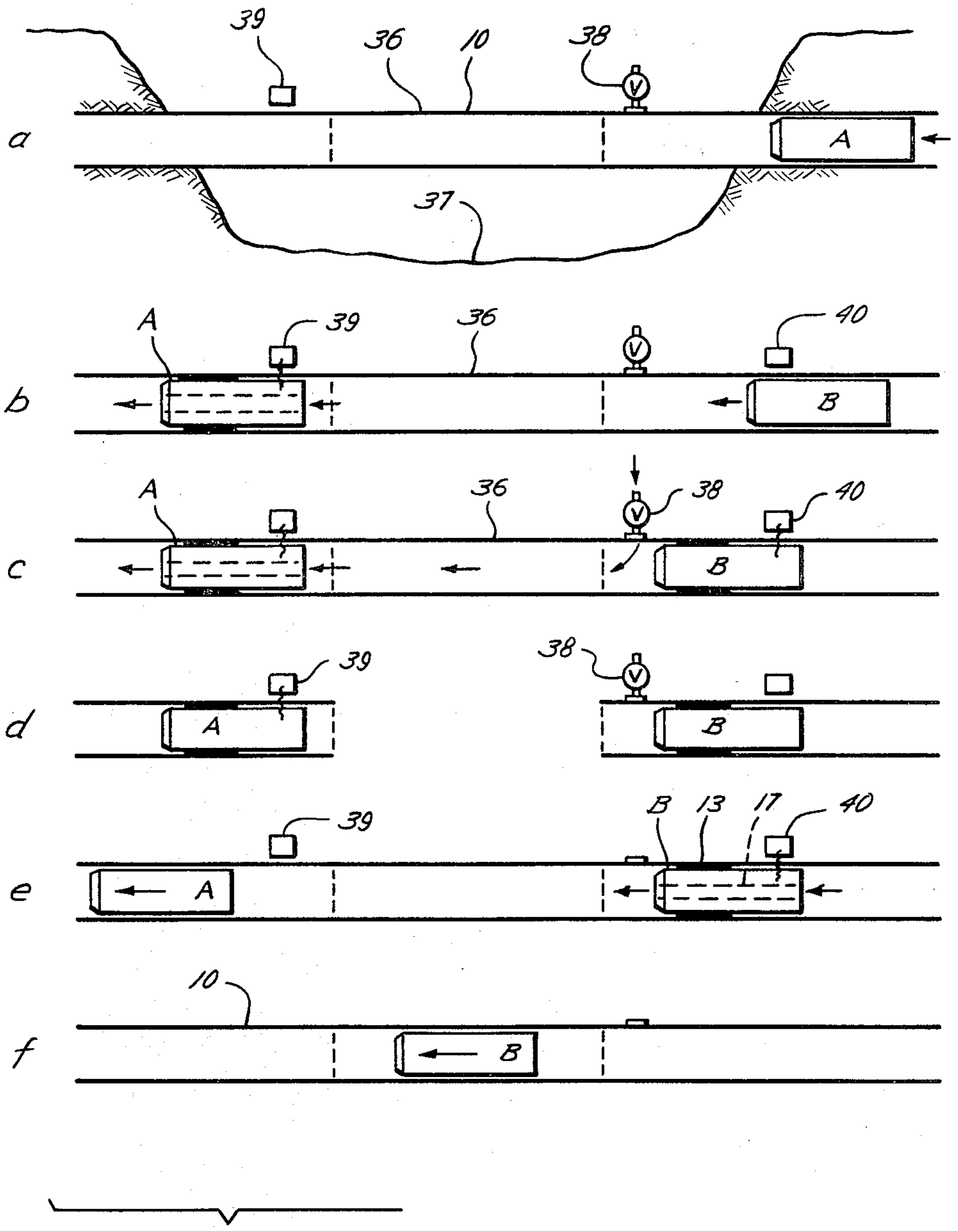

The operational method according to the invention, as illustrated with reference to FIGURE 5, results in several advantages over current pipeline repair practices in that the time required for, and cost of, several lengthy steps are eliminated. The number of valves which need be installed adjacent the section to be repaired, and the size of these valves, is substantially reduced. Also, the installation of a bypass line may be eliminated, or the construction of a burn-off pit may be avoided. Since the entire operational procedure of the invention may be completed in a very short time, the necessity for constructing a temporary line to maintain production may be avoided. Obviously, the necessity for cutting large ports in the pipeline wall for insertion of mechanical plugging devices or mechanical couplings for operating the devices is eliminated.

In FIGURES 6*a*–6*h* another method of plugging a pipeline during repair is illustrated. Here three pigs or plugging assemblies are used, these being designated units A, B, and C. After a section 42 of the pipeline 10 which is to be repaired is identified and located, the excavation made and a valve 43 hot-tapped into the line, then a plugging unit A is inserted into the line by a trap at a pumping station upstream of the section 42, just as in FIGURE 5*a*. The unit A travels along the line until it reaches a signal source 44 just downstream of the section 42. Signals transmitted through the pipewall cause the unit A to be stopped and plugged, the plugging member 13 therein being expanded, and also the bypass port 17 is opened by the valve 18, all under control of signals from the source 44. The fluid product will still flow in the line so that the other plugging units may be brought into place.

Figure 6:
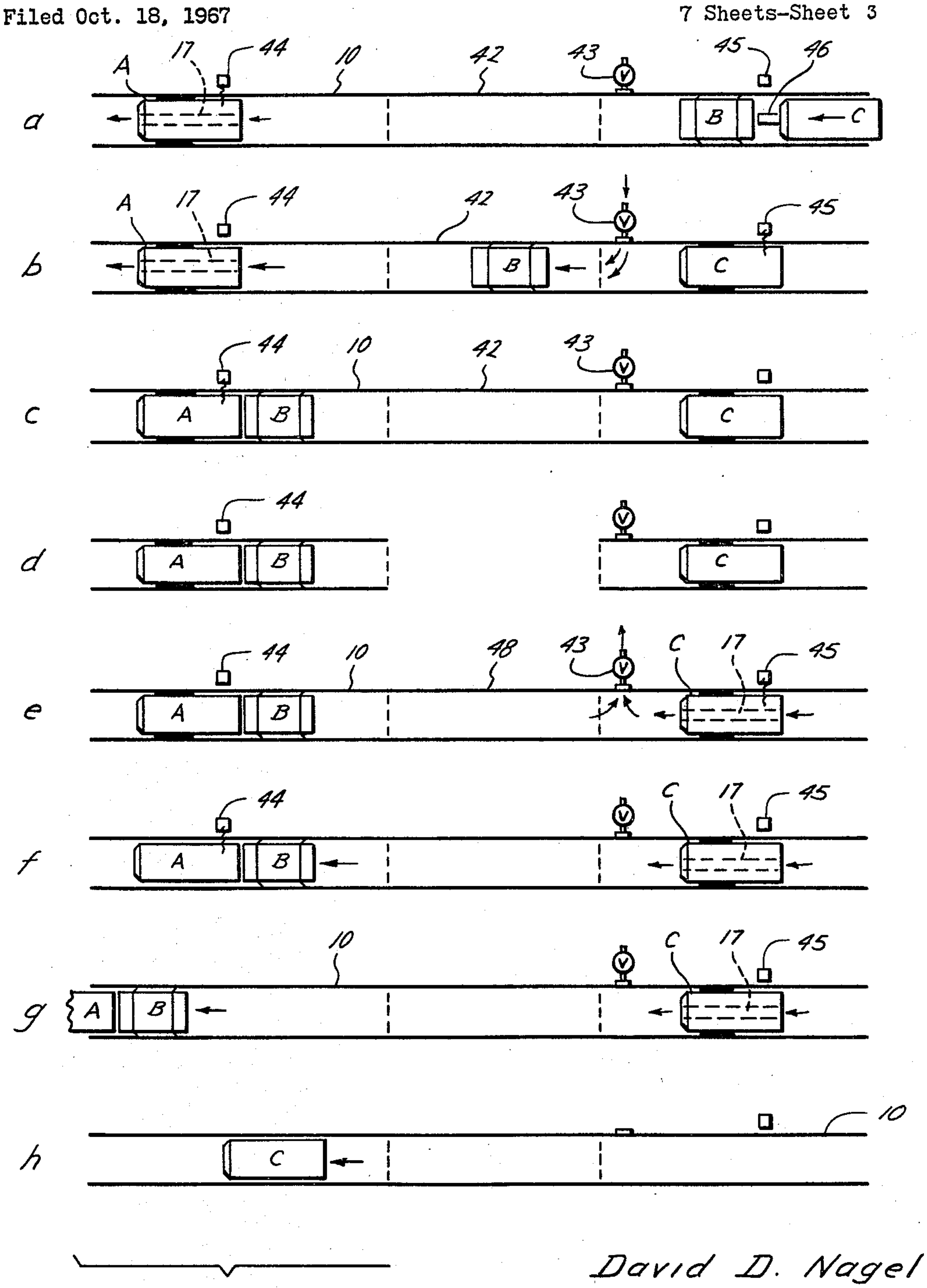

A pair of units B and C, as seen in FIGURE 6*a*, are now inserted into the upstream trap and travel along the line until a signal source 45 at the upstream side is reached. It is noted that the plugging unit C is a complete assembly as seen in FIGURE 1, whereas the unit B is merely a cup or packer type assembly containing no valves or the like but instead consisting only of a device carrying a pair of packers such as the cups 11 and 12 of FIGURE 1 but with no through ports. The unit B is much lighter than the units A and C and requires no controls. The units B and C are coupled together or "piggy-backed" by a separable coupling 46. Alternatively, the unit C may merely push the unit B with no coupling, although the units may bounce apart in such case, the unit B setting too far ahead which would reduce the effectiveness of the flushing operation. When the unit C passes under the signal source 45 it is stopped and plugged by appropriate signals, and its bypass port 17 is closed by a valve 18 (not shown) in this unit. Another signal from the source 45 causes the connection 46 to be decoupled, as by solenoid-operated latch, so that the unit B will be free to move in the pipeline. It is noted in FIGURE 6*b* that the units B and C were stopped in a position such that the valve 43 is in front of the unit C but behind unit B. Thus, inert gas may be forced into the line through the valve 43 to force the unit B toward unit A, discharging the effluent through the bypass port of the unit A due to the piston-like action of the unit B. It may be noted that unit B, just as the other units, includes rubber packers so that it fits fairly tightly and thus will be quite effective in removing all of the effluent from the section 42. When unit B reaches a position abutting the unit A, it stops and the unit A is sealed by signals from the source 44, as seen in FIGURE 6*c*. The section 42 now contains only the inert gas, and the repair may be made by removing the section 42 as seen in FIGURE 6*d* and welding in a new section.

After completing the repair or replacement of the defective section, the valve 43 may be opened and the valve 18 (not shown) in the unit C energized by appropriate signals so that the new section 48 is filled with the fluid product as seen in FIGURE 6*e*, this being necessary only if introduction of a charge of inert gas into the pipeline would be detrimental.

The plugging units are recovered by first venting or opening the bypass port 17 in the unit C by signals from the source 45, as seen in FIGURE 6*f*, while signaling the unit A from the source 44 to cause it to unplug or contract the member 13 therein. The unit A will be propelled by the fluid product passing through the unit C, and will travel along with the unit B downstream to be recovered at a trap at the next pumping station. The unit B follows the unit A, as illustrated in FIGURE 6*g*. After the units A and B have been recovered, the unit C may be released and recovered as indicated by FIGURE 6*h*, the valve 43 having been removed if desired.

The operational method depicted in FIGURES 6*a*–6*h* is preferable where a more positive removal of the effluent is required, particularly for liquid products.

Referring now to FIGURE 7 of the drawings, an enlarged detail view in section of one embodiment of the plugging segment of the apparatus of FIGURE 1 is illustrated. This arrangement includes the radially expandable plugging member 13 operated by the cone-shaped members 14 and 15, these being supported on a generally cylindrical axial member 50 which contains the axial bore 17 functioning as the bypass port. The cylindrical member 50 is supported in the pipeline 10 by the packers 11 and 12, each of which is illustrated as being comprised of a front disk-shaped beveled rubber member along with a rear cup-shaped rubber member, these being held in place by metal disks appropriately bolted to frame members. The front packer 11 is sealed so that it functions to drive the entire assembly through the pipeline, while the rear packer 12 includes a plurality of through holes 51 which permit the fluid product to pass through this packer so line pressure will reach the driving packer 11.

The mechanism for operating the plugging member 13 includes a reversible DC electric motor 52 which is mounted in a fixed position by a bracket 53 attached to the flanged angular member which holds the packer 12 in place. The DC motor 52 is connected by a cable 54 threaded through one of the holes 51 in the packer 12 back to the battery and instrument package for the assembly. The shaft of the motor 52 includes a gear 55 having longitudinal teeth which engage teeth in an arcuate member 56. When the shaft of the motor 52 rotates, the member 56 will be caused to rotate about its central axis due to the engagement of the gear 55 with the teeth on the member 56. Rotation of the member 56 about its axis will cause axial movement of the member 56 along the cylindrical shaft 50 due to gear teeth 57 formed in the member 50 and matching teeth at the inside diameter of the member 56. A bearing surface 58 for the member 56 engages an outer surface 59 of the cone-shaped member 15, a ball bearing member 60 being interposed between the two bearing surfaces. Axial movement of the member 56 to the left will thus cause the cone-shaped member 15 to move to the left and compress a spring 61 which biases the members 14 and 15 apart. Movement of the cone member 15 to the left will result in radial expansion of the plugging member 13, this member being seen in FIGURE 7 to comprise a metal band 62 molded in a rubber casing 63. The structure and function of the plugging member 13 will be described in more detail below.

Turning to FIGURE 8 of the drawing, the plugging assembly is seen in a condition wherein the annular geared member 56 is moved to the left as far as possible by rotation of the shaft of the motor 52, the teeth of the gear 55 sliding axially wtih respect to the teeth of the annular member 56 to account for movement of the member 56 with respect to the central shaft 50. The cone-shaped member 15 is thus pushed to the left, compressing the spring 61, and the metal band 62 is forced radially outward, causing the rubber casing 63 to be forced against the interior of the pipeline wall and to flow in such a manner as to cause a secure sealing and plugging of the pipeline. Reversing the motor 52, causing rotation of the geared shaft 55 in the opposite direction, would cause the annular member 56 to back off away from the bearing surface 59 of the member 15, allowing the spring 61 to force the members 14 and 15 apart, restoring the plugging assembly to the condition seen in FIGURE 7. The cone-shaped members 14 and 15 can move only when the shaft of the motor 52 rotates, and so when the plugging member 13 is expanded and the seal made, the assembly will remain in this condition even though the motor 52 is stopped with no power applied. Thus the assembly is self-locking in either the plugged or unplugged conditions. When the plugging member 13 is in the plugged condition as seen in FIGURE 8, the seal is self-maintaining in the sense that line pressure appearing on the back surface 59 of the member 15 will tend to urge the member 15 to the left, thus tending to urge the member 15 radially outward more rightly against the interior of the pipeline wall. The mechanical advantage inherent in the slope of the cone-shaped portion of the member 15 causes line pressure on the surface 59 to apply more radial pressure to the member 13 tending to strengthen the seal than the tendency for axial movement to the left caused by pressure on the surface 59.

As seen in FIGURES 7 and 8, the valve 18 is connected to the rear terminus of the cylindrical member 50 just behind the packer 12. This valve 18 may be of various forms, the one illustrated being actuated by an electric motor 65 having a geared shaft engaging a worm gear which is attached to the valve plug 66. The motor 65, being a reversible DC motor, is connected by a line or cable 67 to the battery and instrumentation package 20. Rotation of the motor 65 in one direction will cause the cylindrical plug 66 to move into the valve seat, thus shutting off flow of the fluid product in the line through the port 17, while of course rotation of the motor 65 in the other direction will cause the plug 66 to back off from the seat and allow bypass flow through the plugging assembly. The outer port of the valve 18 is connected to the coupling member 19 which contains input ports 68 on opposite sides thereof for admitting the product from the line into the interior of the valve and into the bypass ports 17.

Rather than operate the expandable plugging member 13 by an electric motor which requires a rather large bank of batteries in the instrument package 20, the member 13 may be operated by line pressure, i.e., the pressure in the pipeline 10 due to the fluid product. As seen in FIGURE 9, plugging apparatus is employed in generally the same form as that of FIGURE 7, including packers 11 and 12 and a plugging arrangement comprised of the expandable member 13 with cone-shaped members 14 and 15 arranged on a central cylindrical shaft 50 containing a through bore 17. However, the central shaft 50 includes an arcuate piston 70 secured thereto which is positioned in a recess or chamber 71 in the cone-shaped member 15. Admission of fluid under pressure into the chamber 71 from the right-hand edge of the piston 70 by a passage 72 will urge the cone-shaped member 15 to the right, while admission of fluid under pressure into the left-hand side of the chamber 71 through a passage 73 will urge the member 15 to the left toward a plugged condition. Fluid pressure is applied to one of the passages 72 and 73, and the other is vented, by operation of a sleeve valve 74.

When the sleeve 74 is in a right-hand position as seen in FIGURE 9, the passage 72 is in communication with a slot 75 and, thus, in communication with a passage 76 to which is applied line pressure through a valve, as will be explained. Meanwhile, the passage 73 is connected to a slot 77 in the sleeve 74, this slot being vented to the interior port 17 by a bore 78. Thus, in this condition, the cone-shaped member 15 will be urged to the right or to an unplugged condition. The sleeve 74 may be moved to the left by means of a reversible D.C. motor 80 having a worm shaft 81 engaging teeth 82 on the rear exterior of the sleeve. The motor 80 is connected by a cable extending back to the battery and instrument package 20, whereupon it may be driven in either direction.

When the sleeve 74 is moved to the left, it will be seen that the passage 73 will be connected to the passage 76 containing line pressure by means of the slot 77, while the passage 72 will be vented to the downstream side or to the bore 17 by means of the slot 75 which will then be in communication with an annular bore vented inwardly to the bore 17. Fluid pressure will thus be applied to the left-hand side of the piston 70, and the cone-shaped member 15 will be driven to the left, compressing the spring 61 and forcing the plugging member 13 radially outward against the pipeline wall. The plugging assembly of FIGURE 9 will be held in the plugged position by line pressure, and a secure seal will be provided thereby; however, when line pressure is removed, as occurs in operation of the unit A in FIGURE 5 after unit B has been sealed, an auxiliary supply of fluid under pressure must be provided to hold the seal. This auxiliary supply of fluid under pressure may be provided from a toroid-shaped tank 84 which is connected by a flexible conduit 85 to a valve 86. The valve 86 is operated by an electric motor or solenoid 87 which receives power through a cable going to the battery and instrument package. When the motor 87 drives the valve 86 in one direction, an output line 88 which is coupled to the passage 76 is connected to the conduit 85, while in the other direction the line 88 is connected to an inlet port 89 open to the interior of the pipeline. Thus the passage 76, via the line 88, may be connected to receiver fluid under pressure through either the port 89 or from the tank 84 through the conduit 85. Incidentally, the tank 84 may also be filled by rotating the valve 86 to another position wherein the conduit 85 is in communication with the port 89, whereby fluid under pressure from the interior of the pipeline charges the tank 84. Alternatively, the tank 84 may be charged before the plugging assembly is inserted into the pipeline at the trap.

In operation, the apparatus of FIGURE 9 would be in the condition shown in the drawing while the unit is traveling down the pipeline; then when it reaches the desired position, the motor 80 would be actuated to drive the sleeve 74 to the left, whereby line pressure would be applied to the left-hand side of the piston 70, thus driving the cone-shaped member 15 to the left and expanding and sealing the member 13. At this point the valve 86 would be in a position such that the passage 76 and line 88 are connected to the port 89 so that it is line pressure, rather than the pressure in the tank 84, which is operating the plugging unit. Then, before line pressure is removed from behind the plugging unit of FIGURE 9, the motor 89 would be energized to turn the valve 86 to a position such that the line 88 is connected to the conduit 85, whereby the tank 84 supplies pressure necessary to hold the plugging unit in the seal condition. To unplug the unit, the motor 80 would be energized to turn in the opposite direction, moving the sleeve 74 to the right, venting the left side of the piston 70 downstream, and applying pressure to the right side of the piston 70, either from the tank 84 or from the line. This moves the cone-shaped member 15 to the right, aided by the compressed spring 61. The plugging member 13 will thus contract radially, and the assembly will again be free to travel down the pipeline. It is understood that the operation of the valve 18 and the remainder of the plugging assembly will be the same in FIGURE 9 as in the previous embodiment.

Alternatively, instead of using the auxiliary supply of pressurized fluid to hold the plugging unit in the plugged condition, while at the same time using line pressure to effect the seal, the techniques of FIGURES 7 and 8 may be combined with that of FIGURE 9, producing the assembly seen in FIGURE 10. Here the cone-shaped members 14 and 15, constructed just as in FIGURE 9, would be compressed together by line pressure applied to the left-hand side of a piston 70 through a passage 73, the passage 72 being vented. The passages 72 and 73 lead to a sleeve valve 74 constructed just as in FIGURE 9, the valve 74 being driven to left or right positions by a motor 80 and gear arrangement. In this embodiment, however, the passage 76 communicates directly with the interior of the pipeline at an opening 92 rather than being connected through an electrically operated valve as the valve 86. To lock the plugging member 13 in the sealed position, i.e., to lock the cone-shaped member 15 in the left-hand position, an electric motor 52 along with a gear arrangement 55 engaging an annular member 56 operates just as in the embodiment of FIGURES 7 and 8. In the embodiment of FIGURE 10, however, it is noted that the member 15 and the bearing surface 59 would be driven to the left away from the bearing surface 58 by operation of line pressure in the piston before the motor 52 would be energized. After the seal had been made, the motor 52 would be actuated to cause the member 56 to rotate and the bearing surface 58 run up into engagement with the bearing surface 59, the ball bearing assembly of course being interposed. Thus, after line pressure had been removed, the seal would be maintained until the motor 52 is again energized in the reverse direction to back off on the annular member 56. With this arrangement, the auxiliary supply of pressurized fluid such as the tank 84 in FIGURE 9 need not be relied upon, the auxiliary supply being subject to dissipation due to leakage if the seal must be maintained over a long period of time. Nevertheless, the FIGURE 10 structure utilizes line pressure to effect the stopping and plugging operation which permits this operation to be effected faster without requiring batteries of large capacity as needed for the FIGURE 7 embodiment. With the cone-shaped member 15 held in the left-hand position by line pressure, the annulus 56 may be run up into engagement therewith using very little power supplied to the motor 52. Thereafter, the assembly is static, no power being required to maintain the seal.

The sealing member 13 will now be examined in more detail with reference to FIGURES 11 and 12 of the drawing. The metal band 62 within the member 13 is generally of cylindrical configuration but includes slots 94 extending from opposite ends thereof as seen in FIGURE 11 which would be a top view of the band 62 if the band were severed and stretched out flat. The slots 94 permit the band 62 to expand and contract radially but yet the band is sufficiently structurally rigid to generally maintain its shape and prohibit undue flowing and distortion of the rubber casing 63. As seen in FIGURE 12, which is an enlarged detail view of the plugging member 13 in the plugged condition, the rubber 63 tends to flow at the ends 95 and at the center portion 96, but the tendency for this flow is substantially reduced by the presence of the metal core or band 62. The rubber portion 63 is molded around the band 62 and is also constricted by the slots 94 so that the tendency for flowing is substantially impaired. The sealing member 13 will be rather violently abraded by the interior surface of the pipeline wall during the time when the sealing or plugging member 13 is just beginning to be expanded and begins to contact the pipeline wall while the plugging assembly is still moving, not yet stopped. The fact that the rubber portion is bonded around the slotted band 62 reduces the tendency for the rubber to be abraded away. Thus, the construction of the plugging member 13 as illustrated is substantially improved over the use of a solid rubber member for this purpose. The rubber casing 63 may advantageously include abrasive material impregnated therein to aid in quickly stopping the plugging assembly once the member 13 begins to expand. The use of such abrasive material may be preferred due to the lubricating properties of the liquid petroleum products being transported in the line. Also it may be preferable to employ plugs or teeth to aid in holding the plugging assembly in place against the tremendous pressure differentials appearing across the assembly during the repair operation. As seen in section view in FIGURE 13*a*, and in plan view in FIGURE 13*b*, plugs 97 may be secured to the rear edge of the band 62 to engage the interior of the pipeline wall 10. The plugs are preferably positioned at the rear of the plugging member 13 because this is the portion which first engages the pipeline wall when the plugging is beginning to stop.

The circuitry used to actuate the various valves and motors in the plugging assembly in response to signals transmitted through the pipeline wall may take various forms as will now be explained with reference to the block diagrams of FIGURES 14–16. As noted above, a single detector may be utilized, with the transmitted signal being one of several different frequencies, or being modulated with a selected frequency, then the frequencies separated by filters in the instrumentation package. This type of system is illustrated in FIGURE 14 wherein a detector 100 is depicted which would be of various types depending upon the signal source used. The detector may be a crystal or a photomultiplier responsive to gamma radiation, an eddy current detector, a magnetic flux detector, or an ultrasonic detector. In any event, the output of the detector will be a signal including a frequency component dependent upon the frequency of the transmitted signal. After amplification, the detector output is applied to a bank of bandpass filters 101, each tuned to one of the frequencies of interest. The outputs of the first two filters are applied separately to relay coils 102 and 103, each of which operates single pole, double-throw contacts. The relay contacts are connected with a battery 104 via the cable 54 to the reversible DC motor 52 of FIGURE 7. Utilizing this arrangement, when the relay coil 102 is energized and its contacts closed, current will be supplied from the battery 104 to the DC motor 52 in one direction, whereas when the relay coil 103 is energized current will be supplied to the motor 52 in the opposite direction. Thus, when a signal of one particular frequency is transmitted the motor 52 will be caused to turn in one direction, whereas another given frequency will cause the motor 52 to turn in the opposite direction. In this manner the sealing or plugging member 13 may be driven to the plugged condition or backed off to the release position by controlling the motor 52. A similar set of relays 105, driven by separate ones of the filters 101 responsive to a different set of frequencies, is utilized to drive the valve motor 65 in either direction to either open or close the valve 18. It would be possible to have two frequencies present in the transmitted signal at one time so the valve 18 could be opening while the plugging member 13 is being expanded to the sealed condition. To provide for another function, such as driving the motor 80 in FIGURE 10, the system of FIGURE 14 could include another set of relays 106 operated by the outputs of a pair of filters responsive to another set of frequencies just as in the circuitry used to operate the motors 52 and 65.

Instead of using a separate transmitted frequency for each function, a series of pulses may be employed with the number of pulses coded according to the desired function. As seen in FIGURE 15, a detector 108 would be employed in this system which would produce an output in the form of a pulse or series of pulses depending upon the transmitted signal. The detector 108 may be a gamma ray detector, eddy current detector, etc., as above. The pulses, coded in number, are used to actuate a numerical register which may take the form of a stepping relay 109. The contacts of the stepping relay in each position energize one or more of the DC motors 52, 65 and 80 with current in either direction so that each of the motors may be selectively driven either forward or reverse depending upon the number of pulses produced at the detector output, i.e., depending upon the position to which the stepping relay advances. Other types of counters could be used instead of a stepping relay, such as a plurality of bistable circuits connected as a register.

A plurality of separate detectors may be used as seen in the diagram of FIGURE 16, rather than a single detector as seen in FIGURE 14 or 15. In this case, the transmitted signals need not be coded in frequency or pulses, but instead a separate signal source would be provided for each function as illustrated by the plurality of detectors and magnetic flux sources shown in the embodiments of FIGURES 3 and 4, for example. Thus each of the detectors 110 may correspond to one of the detector shoes 32, it being understood that any number of the detector shoes 32 may be provided in FIGURES 3 and 4. Also, several different types of detectors may be used in one plugging assembly, such as several flux leakage detectors, an eddy current detector, and a gamma ray detector and so the bank of detectors 110 may correspond to several different types of detectors. The outputs of each pair of detectors is applied to sets of relays 111 similar to the relays 102 and 103 of FIGURE 14. Accordingly, three motors may be driven in either forward or reverse directions as before.

The examples of circuitry used to control the electric motors and valves in the plugging assemblies of the invention as seen in FIGURES 14–16 are merely illustrative, and it is apparent that other systems of this type may be utilized. Also, there are other motive power systems which may be used in place of the electric or line pressure arrangements disclosed. For example, an electrically driven hydraulic pump may be used to drive the piston and cylinder arrangement of FIGURE 9, rather than employing line pressure.

In using the plugging assembly of the invention in one of the operational methods described above, the plugging uints are hidden within the pipeline, and there is no way to directly observe the operation of the device nor verify that the various functions commanded by signals transmitted to the device have actually been performed. For example, after the two units, one on each side of the section to be repaired, have been commanded to stop, plug and seal, the external manifestation that these functions have been performed is only through such things as line pressures and flow rates at upstream and downstream pumping stations many miles away, by the detected pressures at the location if taps have been made, by the noises produced by the plugging units in traveling and in operating the motors, and by tapping on the pipe to determine the location of the plugging units. More positive verification may be obtained at the repair location by utilizing the system of FIGURE 17, which includes means for producing a feedback signal which may be detected outside the pipeline wall to indicate that various functions have been performed. This system is generally similar to that of FIGURE 14 in that a detector coil 115, in this case an eddy current detector coil, is connected through a preamplifier to a filter 116 which is one of a bank of filters such as the filters 101. The filter outputs are used to operate sets of relays 117, the contacts of which apply appropriate currents to the DC motor 52 and others. A detector 118, having an input connected across or in series with the motor 52, produces an output which is an indication of whether or not voltage or current has been applied to the motor. This output operates an oscillator 119 having a predetermined frequency, and the output of this oscillator is amplified and applied back to the coil 115. An eddy current detector coil 120 is positioned external to the pipeline wall 10, along with the eddy current source coil 28, and the output of this coil 120 may be detected and filtered to produce a visual indication of whether or not the motor 52 has been energized. The actual mechanical movement of the various parts may also be detected by a limit switch 121, for example, which may detect whether or not the cone-shaped member 15 has been moved with respect to the member 14. Closing the switch 121 actuates an oscillator 122 of another predetermined frequency, and the output of this oscillator is also applied back to the detector coil 115. Thus, not only electrical energization, but also mechanical movement within the plugging assembly may be detected and fed back to a detector external to the pipeline wall.

While the invention has been described with reference to particular embodiments, this description is not to be construed in a limiting sense. Various modifications of the disclosed embodiments, as well as other embodiments of the invention, may be apparent to persons skilled in the art upon reference to this description. It is therefore contemplated that the appended claims will cover any such modifications or embodiments as fall within the true scope of the invention.

What is claimed is:

1. An improved method for plugging a section of a pipeline comprising the steps of:

inserting first plugging means into the pipeline upstream of said section and moving the plugging means along the pipeline under propulsion of fluid in the pipeline;

coupling first control signals through the wall of the pipeline just downstream of said section;

detecting said first control signals at said first plugging means within the pipeline;

frictionally engaging the interior wall of the pipeline in response to the detected first control signals whereby movement of the first plugging means through the pipeline is halted;

venting the first plugging means whereby fluid in the line may pass through;

inserting second plugging means into the piepline upstream of said section and moving such means along the pipeline under propulsion of fluid in the pipeline;

coupling second control signals through the wall of the pipeline just upstream of said section;

detecting the second control signals at said second plugging means within the pipeline;

frictionally engaging the interior wall of the pipeline in response to the detected second control signals whereby movement of the second plugging means through the pipeline is halted;

coupling third control signals through the wall of the pipeline just downstream of said section;

detecting said third control signals at said first plugging means within the pipeline;

sealing the first plugging means in response to the detected third control signals whereby venting of fluid through the first plugging means is stopped; and transmitting signals from the plugging means within the pipeline and detecting the transmitted signals external to the pipeline wall to vertify performance of at least one of said frictionally engaging steps.

2. A method of operating apparatus that moves through the interior of a pipeline for the purpose of performing operations within the pipeline comprising, inserting said apparatus within the pipeline and moving the apparatus through the pipeline, said apparatus responding to a command signal and performing some operation in response thereto, producing a verifying signal in response to the performance of said operation and transmitting the verifying signal through the pipeline wall to a location external to said pipeline and adjacent the apparatus to verify the performance of said operation by the apparatus within the pipeline.

3. A method of operating apparatus that moves through the interior of a pipeline for the purpose of performing operations within the pipeline comprising, inserting said apparatus within the pipeline and moving the apparatus through the pipeline, signaling to the apparatus through the pipeline wall from a location external to the pipeline and adjacent the position of the apparatus, said apparatus detecting a signal from the external location and performing some operation in response thereto, producing a verifying signal within the apparatus in response to the performance of said operation, and transmitting the verifying signal through the pipeline wall to said external location to verify the performance of said operation by the apparatus within the pipeline.

References Cited

UNITED STATES PATENTS

| | | | |
|---|---|---|---|
| 2,517,626 | 8/1950 | Berg | 138—97 |
| 2,601,248 | 6/1952 | Brenholdt | 175—83 |
| 3,042,116 | 7/1962 | Sharp et al. | 138—89 |
| 3,106,735 | 10/1963 | Landrum et al. | 138—97 |
| 3,285,290 | 11/1966 | Morrison | 138—97 |
| 3,298,399 | 1/1967 | Slade | 138—97 |
| 3,381,714 | 5/1968 | Johnson | 138—97 |

HERBERT F. ROSS, Primary Examiner

U.S. Cl. X.R.

324—67